(12) United States Patent
Wood et al.

(10) Patent No.: US 10,960,340 B2
(45) Date of Patent: Mar. 30, 2021

(54) COMPOSITION AND SYSTEM FOR GAS STORAGE

(71) Applicant: COMMONWEALTH SCIENTIFIC AND INDUSTRIAL RESEARCH ORGANISATION, Acton (AU)

(72) Inventors: Colin David Wood, Willetton (AU); Xavier Mulet, Victoria (AU); Matthew Roland Hill, Victoria (AU)

(73) Assignee: COMMONWEALTH SCIENTIFIC AND INDUSTRIAL RESEARCH ORGANISATION, Australian Capital Territory (AU)

(*) Notice: Subject to any disclaimer, the term of this patent is extended or adjusted under 35 U.S.C. 154(b) by 673 days.

(21) Appl. No.: 15/573,756

(22) PCT Filed: Jul. 8, 2016

(86) PCT No.: PCT/AU2016/050600
§ 371 (c)(1),
(2) Date: Nov. 13, 2017

(87) PCT Pub. No.: WO2017/004682
PCT Pub. Date: Jan. 12, 2017

(65) Prior Publication Data
US 2018/0104638 A1    Apr. 19, 2018

(30) Foreign Application Priority Data
Jul. 8, 2015 (AU) .................................. 2015902697

(51) Int. Cl.
*B01D 53/02* (2006.01)
*F17C 11/00* (2006.01)
(Continued)

(52) U.S. Cl.
CPC ............ *B01D 53/02* (2013.01); *B01J 20/226* (2013.01); *B01J 20/267* (2013.01);
(Continued)

(58) Field of Classification Search
CPC ........ B01D 2253/202; B01D 2253/204; B01D 2253/25; B01D 2253/306;
(Continued)

(56) References Cited

U.S. PATENT DOCUMENTS

2003/0148165 A1    8/2003 Muller et al.
2007/0209505 A1*   9/2007 Liu ...................... B01D 53/228
                                                        95/45
(Continued)

FOREIGN PATENT DOCUMENTS

EP    2 662 609 A2    11/2013
WO    2010/075610 A1    7/2010
(Continued)

OTHER PUBLICATIONS

International Search Report dated Sep. 1, 2016 for Application No. PCT/AU2016/050600.
(Continued)

*Primary Examiner* — Christopher P Jones
(74) *Attorney, Agent, or Firm* — Ladas & Parry LLP

(57) ABSTRACT

A composition for gas storage including a mixture of particles of amorphous macroporous organic polymer (MOP) and particles of a metallic organic framework (MOF).

27 Claims, 3 Drawing Sheets

(51) Int. Cl.
  *B01J 20/26* (2006.01)
  *B01J 20/28* (2006.01)
  *B01J 20/22* (2006.01)
  *C08G 61/02* (2006.01)

(52) U.S. Cl.
  CPC ..... *B01J 20/28004* (2013.01); *B01J 20/2808* (2013.01); *B01J 20/28064* (2013.01); *B01J 20/28066* (2013.01); *C08G 61/02* (2013.01); *F17C 11/00* (2013.01); *F17C 11/005* (2013.01); *F17C 11/007* (2013.01); *B01D 2253/202* (2013.01); *B01D 2253/204* (2013.01); *B01D 2253/25* (2013.01); *B01D 2253/306* (2013.01); *B01D 2257/7025* (2013.01); *B01D 2259/4525* (2013.01); *B01J 2220/44* (2013.01); *C08G 2261/135* (2013.01); *C08G 2261/45* (2013.01); *F17C 2221/01* (2013.01); *F17C 2221/012* (2013.01); *F17C 2221/014* (2013.01); *F17C 2221/016* (2013.01); *F17C 2221/017* (2013.01); *F17C 2221/031* (2013.01); *F17C 2221/033* (2013.01); *Y02C 20/10* (2013.01); *Y02C 20/20* (2013.01); *Y02C 20/40* (2020.08); *Y02E 60/32* (2013.01)

(58) Field of Classification Search
  CPC .... B01D 2257/7025; B01D 2259/4525; B01D 53/02; B01J 20/226; B01J 20/267; B01J 20/28004; B01J 20/28064; B01J 20/28066; B01J 20/2808; Y02C 20/10; Y02C 20/20
  See application file for complete search history.

(56) References Cited

U.S. PATENT DOCUMENTS

| | | |
|---|---|---|
| 2008/0227634 A1 | 9/2008 | Muller et al. |
| 2014/0099571 A1* | 4/2014 | Proietti .............. H01M 4/8828 |
| | | 429/527 |
| 2014/0162872 A1* | 6/2014 | Bohringer ............. B01D 53/02 |
| | | 502/402 |
| 2015/0017526 A1* | 1/2015 | Zhou ...................... H01M 4/62 |
| | | 429/212 |
| 2015/0034500 A1 | 2/2015 | Kim et al. |

FOREIGN PATENT DOCUMENTS

| | | |
|---|---|---|
| WO | 2014/028574 A2 | 2/2014 |
| WO | 2014028574 A1 | 2/2014 |
| WO | 2014/078914 A1 | 5/2014 |
| WO | 2015/011654 A1 | 1/2015 |

OTHER PUBLICATIONS

Chang, Ze, et al., "Microporous Organic Polymers for Gas Storage and Separation Applications", Phys. Chem. Chem. Phys. 2013, 15, 5430-42.
Dawson, R., et al, "Nanoporous Organic Polymer Networks"; Progress in Polymer Science, 2012, 37, 530-563.
Konstas, Kristina et al., "Lithiated Porous Aromatic Frameworks with Exceptional Gas Storage Capacity", Angewandte Chemie, 2012, 124, pp. 6743-6746.
Ahmed, Imteaz, et al., "Composites of Metal-Organic Frameworks—Preparation and Application in Adsorption", Materials Today, 2014, vol. 17, No. 3, pp. 136-146.
X. Zhu et al. CISC Journal, vol. 65, May 2014 Progress of CO2 Capture and Separation by Porous Organic Polymers (Abstract attached).

* cited by examiner

COMPOSITION AND SYSTEM FOR GAS STORAGE

RELATED APPLICATION

This application is a national phase under 35 USC 371 of International Patent Application No.: PCT/AU2016/050600 filed on 8 Jul. 2016, which claims priority from Australian Patent Application No. 2015902697 filed on 8 Jul. 2015, the disclosures of which are incorporated herein by reference in their entirety.

TECHNICAL FIELD

The invention relates to a composition for gas storage, to a method of preparing the composition and to a system and process for gas storage using the composition.

BACKGROUND OF INVENTION

Adsorbed gas technologies have well recorded advantages for the storage of gases compared to compressed or liquefied gas. These advantages include the ability to use lower pressures for volumes equivalent to compressed gas technology, safer storage, the ability to use less expensive storage tanks and increased versatility in tank shape.

Metal-organic frameworks (MOFs) are known for use in gas storage. MOFs comprise organic ligands and metal ions or clusters which together form the skeleton of the metal organic framework in which the organic ligand forms links between nodes formed of metal ions or clusters. Examples of MOF and their use in gas storage are disclosed in US Publn. 2003/0148165.

While MOFs or other porous materials may be used in gas storage there is a need for compositions and systems which provide improved overall storage of gases at the desired pressure.

SUMMARY OF INVENTION

We have found that the incorporation of particles of an amorphous microporous organic polymer (MOP) in a gas storage composition comprising MOF particles provides increased storage efficiency by virtue of interaction between the MOP particles and the MOF particles under gas storage conditions.

Accordingly we provide a composition for gas storage comprising a mixture of particles of amorphous microporous organic polymer (MOP) and particles of a metallic organic framework (MOF).

It is preferred that the particles of MOP have a BET surface area of at least 500 $m^2/g$, more preferably at least 600 $m^2/g$ and most preferably at least 700 $m^2/g$.

In one set of embodiments the weight ratio of amorphous MOP to MOF in the mixture is in the range of from 1:20 to 20:1, preferably from 1:10 to 10:1.

In one set of embodiments the particles of MOP and particles of MOF have an average particle size of no more than 0.5 mm preferably no more than 0.2 mm and most preferably no more than 0.1 mm.

In one set of embodiments the composition is in the form of a particulate composite of the particles of amorphous microporous organic polymer (MOP) and particles of a metallic organic framework (MOF) wherein the composite comprises a mixture of particles fused under pressure. The composite may be in the form of shaped articles of the fused mixture having a minimum dimension of at least 1 mm.

The particles of amorphous MOP are preferably disposed in interstitial spaces between MOF particles and are typically swellable in the presence of the gas to be stored.

The amorphous MOP generally comprises a porous polymer comprising aromatic polymer units. In one set of embodiments the amorphous MOP comprises one or more materials selected from the group consisting of polymers of intrinsic microporosity (PIMS), porous aromatic frameworks (PAFs), hypercrosslinked polymers and more preferably the amorphous MOP is a hypercrosslinked polymer.

In a further set of embodiments we provide a process for preparation of a composition for gas storage in the form of a composite material comprising providing particles of amorphous MOP and particles of MOF, mixing the particles to form a mixture thereof and compressing the mixture to fuse and shape the particles and form a composite. The compression may, for example, be conducted by pressing and/or by extruding the homogenous mixture of particles.

In one set of embodiments compression of the mixture of particles of amorphous MOP and particles of MOF is carried out by subjecting the mixture to a temperature in the range of 10° C. to 300° C. and pressure in the range of 1 to 50 tonne.

In a further set of embodiments there is provided a system for gas storage comprising a container having an entrance for gas to be stored and optionally a separate exit for the gas, to allow gas to enter and exit the container and a composition for gas storage as described herein within the container.

The composition and gas storage system may be used in storage of a range of gases. Examples of gases which may be stored may be selected from the group consisting of hydrogen, natural gas, methane, saturated and unsaturated hydrocarbons including: propane, butane, isobutane as well as: phosphine, helium, oxygen, argon, hydrogen sulphide, biogas, arsine, boron trifluoride, carbon monoxide, diborane, trimethylboron, carbon dioxide, Dichlorosilane, Disilane, Germane, Methylsilane, Silane, Silicon Tetrachloride, Germanium Tetrafluoride, Silicon Tetrafluoride, Trichlorosilane hydrogen bromide, hydrogen chloride, chlorine, iodine, nitrogen, air, Ammonia, Sulphur Dioxide, Tungsten Hexafluoride, Nitrous Oxide, Halocarbon 116, Halocarbon 14, Halocarbon 218, Halocarbon 23, Halocarbon 32, Halocarbon RC318, Hydrogen bromide, Hydrogen chloride, Hydrogen fluoride, Chlorine, Sulphur hexafluoride, Boron Trichloride, Nitrogen Trifluoride, Methylbromide, Refrigerant gases e.g. R134a, Fumigant gases, pesticide gases, herbicidal gases and noble gases such as Xenon, Radon. Preferred gases may include those in which the MOP is swellable. In one set of embodiments the gas is selected from carbon dioxide and natural gas.

Throughout this specification, use of the terms "comprises" or "comprising" or grammatical variations thereon shall be taken to specify the presence of stated features, integers, steps or components but does not preclude the presence or addition of one or more other features, integers, steps, components or groups thereof not specifically mentioned.

DETAILED DESCRIPTION

Figure 1:
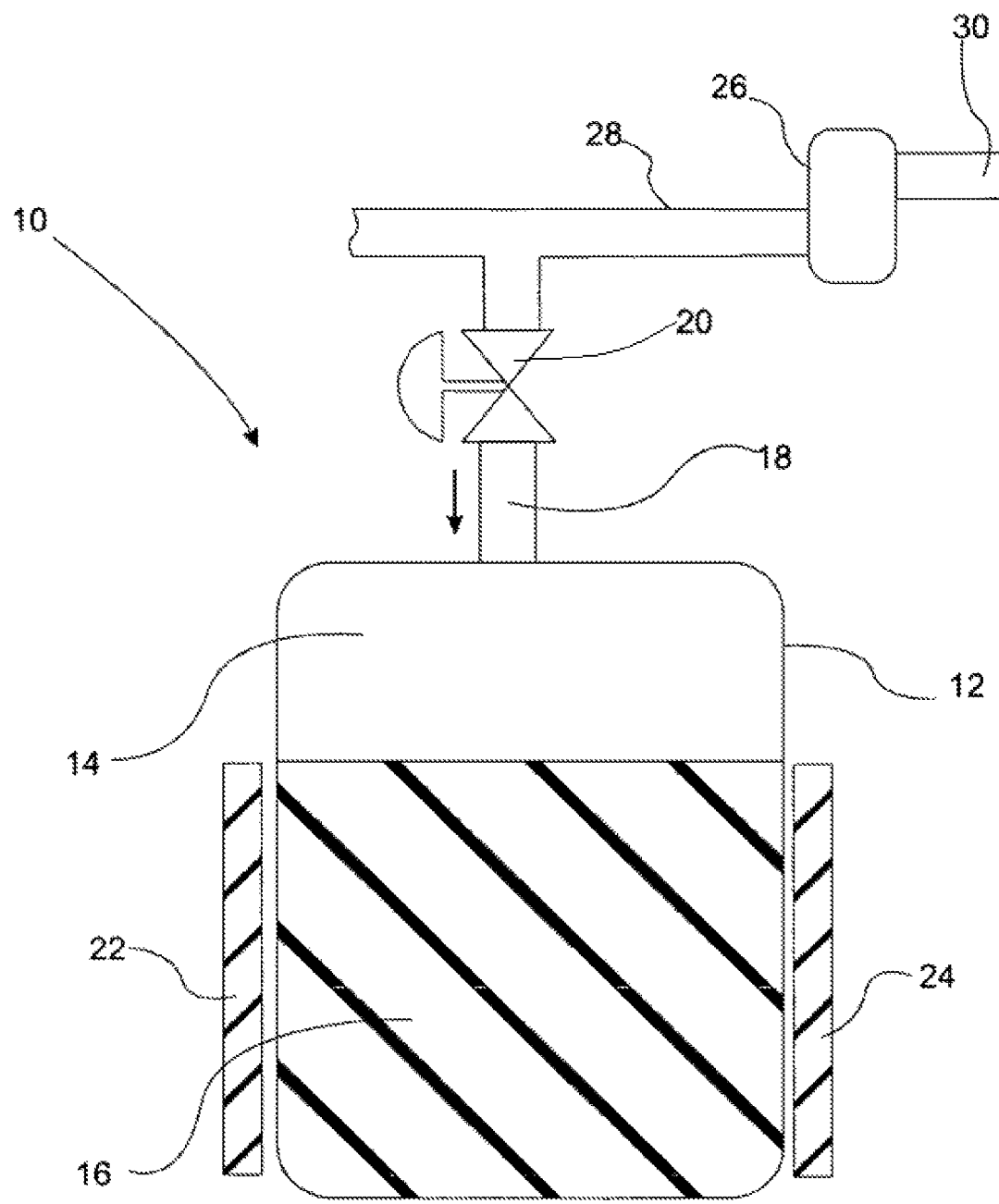
FIG. 1 is a schematic illustration of a gas storage system in accordance with one embodiment.

We have found that a mixture of MOF particles and amorphous MOP particles provides an interaction between MOP and MOF which significantly increases the gas storage capacity. Without wishing to be bound by theory we believe the improvement results from the reduction in interstitial voids (that do not contribute to gas uptake) between the MOF particles and swelling of amorphous MOP particles which occurs on their contact with gases. Thus while MOF is generally a crystalline material and retains a fairly uniform particle size the solid MOP particles during gas storage expand to more completely occupy the interstitial spaces between MOF particles. This, we believe significantly increases the surface area for gas storage.

The mixture may be in the form of a free flowing powder of discrete MOF and MOP particles, which allows convenient filling of vessels for gas storage by simply pouring the mixture into a container. In general the average particle size of the mixture is no more than 0.5 mm preferably no more than 0.2 mm and most preferably no more than 0.1 mm. The particles will generally be of size of at least 10 micron and more preferably at least 50 microns.

The mixture of particulate MOF and MOP may be in the form of a composite comprised of a fused composition comprising an intimate mixture of particles of MOP and MOF. The fused composition may be formed by compression of the mixture such as by applying pressure to a mixture or extruding the mixture. In one set of embodiments compression is carried out by subjecting the mixture to a temperature in the range of 10° C. to 300° C. and pressure in the range of 1 to 50 tonne.

The term "composite" where used herein refers a material comprising particles of amorphous MOP and particles of MOF which are mixed and in intimate contact, e.g. not present as a simple unassociated mixture. While composed of two or more particulate substances having different physical characteristics each substance retains its identity while contributing desirable properties to the composite. While the composite material is prepared by forming the mixture of particles, which work together to give the composite unique properties, the different particles can be distinguished as they do not dissolve or blend into each other.

The composition may be a composite in the form of one or more shaped bodies such as spherical granules, rods, disks or irregularly shaped materials. The shaped bodies may be formed to having a crush strength in the range of 2 to 50 kg.

While some of the amorphous MOPs may be soluble in some solvents the components are mixed in solid particulate form as dissolution of the amorphous MOP in a solvent and combining a solution with the MOF significantly reduces the ability of the composite to form a shape. Evaporation of solvent leaves voids within the material which reduce the overall volumetric gas uptake.

The particles of amorphous MOP are generally composed of microporous polymers of aromatic monomers and include microporous organic polymers selected from the group consisting of hypercrosslinked polymers (also known as Davankov polymers) including conjugated microporous polymers (CMPs) which are a subclass of hypercrosslinked polymers, polymers of intrinsic microporosity (PIMs) and porous aromatic frameworks (PAFs).

In a preferred set of embodiments the particles of MOP, preferably hypercrosslinked polymer have a Brunauer-Emmett-Teller (BET) surface area in the range of from 500 $m^2/g$ to 2500 $m^2/g$ and preferably from 600 $m^2/g$ to 2500 $m^2/g$ such as 700 $m^2/g$ to 2500 $m^2/g$, 1000 $m^2/g$ to 2500 $m^2/g$ or from 1500 $m^2/g$ to 2500 $m^2/g$.

Specific examples of hypercrosslinked polymers which may be used in preparation of hypercrosslinked polymer particles are disclosed by Davankov and coworkers (U.S. Pat. No. 3,729,457, US Publn 2003/0027879; *Macromolecules* 29 (1996) 8396; *J. Poly. Sci Part A: Polym. Chem.* 35 (1997) 3847; *J. Poly. Sci Part A: Polym. Chem.* 37 (1999) 1451 and *Reactive and Functional Polymers*, 66 (2006) 768-779). Examples of hypercrosslinked polymers are also described by Hradil et al., *React and Functl. Polym.*, 67 (2007) 432-441 and Xu et al., "Recent Development of Hypercrosslinked Microporous Organic Polymers", *Macromol. Rapid Commun.* (2013), 34, 471-484.

In one set of embodiments the hypercrosslinked polymer comprises optionally-substituted aryl groups covalently linked by methylene bridging groups. Generally each optionally substituted aryl is covalently linked to one or more optionally substituted aryl by bridging methylene groups between adjacent optionally substituted aryl groups. In one set of embodiments the methylene bridging groups form covalent links between adjacent aryl groups to form a six membered carbocyclic ring fused with adjacent aryl groups.

In one set of embodiments the hypercrosslinked polymer comprises optionally substitute aryl groups (Ar) covalently linked through methylene bridging groups ($CH_2$) to form $-(Ar-CH_2-Ar-CH_2)_n-$ wherein n is the number of repeating units.

In embodiments where the methylene bridging groups form covalent links between two adjacent aryl groups to form a six membered carbocyclic ring that is attached to the aryl rings, the methylene bridge may provide a six membered ring between adjacent aryl groups forming, for example, 9,10-dihydroanthracene structure where the aryl groups are substituted benzene.

The hypercrosslinked polymer may be prepared by crosslinking of an optionally substituted aryl monomer or polymer thereof with a crosslinker preferably selected from chloromethyl methyl ether, chloromethyl ethyl ether, chloromethyl polyether or dimethylformal, bischloromethylated benzene such as p-xylylene dichloride, bis-chloromethylated biphenyl, 4,4'-bis[4-(chloromethyl)phenyl]butane, tetrachloromethane, sulphur halides, and mixtures thereof preferably in the presence of a Friedel Crafts catalyst.

In one set of embodiments the microporous organic polymer is prepared by polymerisation of an optionally substituted aryl monomer with an external crosslinker preferably selected from monochlorodimethyl ether or dimethyl formal or mixtures thereof, preferably polymerisation is by Friedel Crafts catalysed polymerisation.

In one set of embodiment the hypercrosslinked polymers are prepared by post polymerisation cross linking. In a further set of embodiments the hypercrosslinked polymers are prepared by direct Friedel Crafts alkylation (without the need for a precursor crosslinked polymer) of a monomer composition comprising aryl monomers containing two or more chloromethyl groups such as dichloroxylylene, bis(chloromethyl)biphenyl and bis(chloromethyl)anthracene.

In one set of embodiments the preparation of hypercrosslinked polymer may involve cross linking of polymers of one or more of styrene, divinylbenzene and vinylbenzylchloride. Examples of crosslinking agent include those selected from the group consisting of chloromethyl methyl ether, chloromethyl ethyl ether, chloromethyl polyether or dimethylformal, bischloromethylated benzene such as p-xylylene dichloride, bis chloromethylated biphenyl, 4,4'-bis[4-(chloromethyl)phenyl]butane, tetrachloromethane, sulphur halides, and tetrachloromethane. It will be appreciated, however that a wide range of crosslinking agents may be used. Crosslinking is generally conducted in the presence of a Friedel Crafts catalyst such as chlorides of tin(IV), iron (III) and aluminium (III). The process generally utilises a solvent in which the polymer is swellable such as aromatic or aliphatic hydrocarbons and chlorinated hydrocarbons such as dichloroethane, chloroform, nitrobenzene, toluene octane and the like solvents. In one embodiment a polymer of chloromethylstyrene is cross linked using a Friedel Crafts catalyst.

The surface area of the hypercrosslinked polymer is generally increased with increasing amounts of Friedel Crafts catalyst.

In one set of embodiments the hypercrosslinked polymer particles are formed by post polymerisation crosslinking of polymers containing optionally substituted aryl preferably selected from optionally substituted styrene, divinyl benzene, vinylbenzyl chloride and optionally substituted aryl comprising at least two chloromethylene substituents. The polymerisation and or post-polymerisation crosslinking (preferably both) may be conducted with Friedel Crafts catalysis.

In one set of embodiments the hypercrosslinked polymer is a polymer of a substituted aryl monomer comprising at least two chloromethylene substituents, preferably prepared by Friedel Crafts catalysed polymerisation.

In a further set of embodiments the hypercrosslinked polymer is prepared by polymerisation of an optionally substituted aryl monomer with an external crosslinker preferably selected from the group consisting of chloromethyl methyl ether, chloromethyl ethyl ether, chloromethyl polyether or dimethylformal, bischloromethylated benzene such as p-xylylene dichloride, bis-chloromethylated biphenyl, 4,4'-bis[4-(chloromethyl)phenyl]butane, tetrachloromethane, sulphur halides, and tetrachloromethane and mixtures thereof preferably in the presence of a Friedel Crafts catalyst.

In one specific embodiment in which the hypercrosslinked polymer comprises optionally substituted aryl groups (Ar) covalently linked through methylene bridging groups ($CH_2$) to form —(Ar—$CH_2$—Ar—$CH_2$)$_n$ the repeating unit is at least one of formula I and formula II:

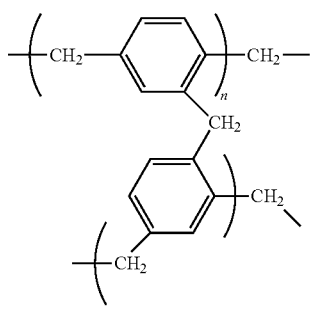

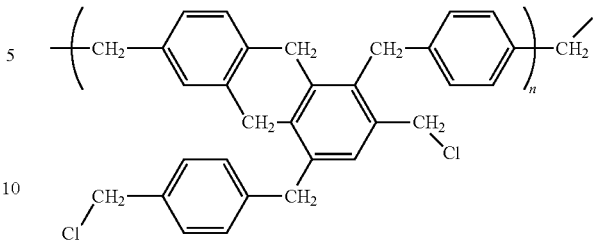

wherein n represents the number of repeating units in cross-linked chains. Examples of n may be from 20 to 10000. The polymer may comprise a mixture of both formula I and formula II type repeating units.

Another approach to hypercrosslinked polymers is the reaction of multilithiated aromatics such as 4,4'-dilithiobiphenyl with carbonates such as dimethylcarbonate.

The specification refers to aryl and substituted aryl. Aryl groups include carbocyclic aryl and heterocyclic aryl. Examples of carbocyclic aryl may be selected from the group consisting of benzene, biphenyl, naphthylene, tetrahydronaphthylene, idene, azulene, anthracene and the like.

Examples of heterocyclic aryl may be selected from the group consisting of furanyl, thiophenyl, 2H-pyrrolyl, pyrrolinyl, oxazolinyl, thiazolinyl, indolinyl, imidazolidinyl, imidazolinyl, pyrazolyl, pyrazolinyl, isoxazolidinyl, isothiazolinyl, oxadiazolinyl, triazolinyl, thiadiazolinyl, tetrazolinyl, pyridinyl, pyridazinyl, pyrimidinyl, pyrazinyl, triazenyl, indolyl, isoindolinyl, benzimidazolyl, benzoxazolyl, quinolinyl, isoquinolinyl, and the like.

Examples of optional substituents include $C_1$ to $C_4$ alkyl such as methyl and ethyl, $C_2$ to $C_4$ alkenyl such as vinyl, halo-$C_1$ to $C_4$ alkyl such as chloromethyl, amino, $C_1$ to $C_4$alkylamino, di-(C1 to C4 alkyl)amino and sulfonate.

The number of optional substituents may be 0 to 4, preferably 0 to 3.

A further group of hypercrosslinked polymers include the element organic frameworks [EOFs] which comprise a three dimensional network of aromatic groups linked covalently by direct element-carbon bonds. The aromatic groups are arranged in a tetrahedral configuration about the element where the element may, for example, be silicon or a metal such as tin, antimony or bismuth. The EOFs may be prepared by reaction of a dilithiated aromatic (such as lithiated 4,4'-dibromobiphenyl) with a tetraethylorthosilicate to provide polysilane EOFs or metal chlorides such as $SnCl_4$, $BiCl_3$ or $SbCl_3$ to form the corresponding metal EOFs. Specific examples of EOFs are described in Dawson et al, *Progress in Polymer Science* 37 (2012) 530-563 and Fritsch et al *Materials* 2010, 3 2447-2462.

Examples of EOFs include EOF-1, EOF-2, EOF-3, EOF-4 and EOF-5.

A further group of hypercrosslinked polymers are hypercrosslinked polyaniline and polypyrrole. Polyanilines may be hypercrosslinked using diiodomethane or paraformaldehyde or using Ullman or Buchwald coupling and have the advantage of not requiring lithiating agents or Lewis acids which produce HCl.

The hypercrosslinked polymer composition may be prepared in a range of particle sizes. Generally the particles are of size 20 nm to 200 μm. The pores of the porous hypercrosslinked polymer particles may have a median diameter of less than about 100 μm. In one embodiment, the pores can have a median diameter of about 0.10 μm to about 10 μm, with no particular distribution of shape or size required. The porous particles may be microporous.

The term "microporous" is used to mean that the particles have interconnecting holes and orifices (i.e. the pores) with an average size of less than about 2 nm (micropores). There is a family of substituted polyacetylenes containing bulky substituents, best represented by poly(1-trimethylsilyl-1-propyne) (PTMSP), that has been classified as 'ultra-high free volume' on the basis of exceptionally high gas permeability. The large amount of free volume (~30%) found in freshly prepared PTMSP is interconnected, thus allowing the rapid diffusion of gas. The substituted polyacetylenes polymer such as poly(1-trimethylsilyl-1-propyne) (PTMSP) which has been used in preparation of membranes for gas separation is not herein considered microporous because of its rapid loss of microporosity on standing and lack of chemical stability towards heat, radiation, or ultraviolet light in the presence of oxygen. Further while the porosity of these polymers is initially high physical ageing results in a rapid loss of porosity to about 2.5% within about 1 to 2 weeks.

Conjugated microporous polymers (CMPs) are a subclass of hypercrosslinked polymers that combine 7-conjugated skeletons with nanopores. The CMPs, in one set of embodiments comprise aromatic rings and optionally also carbon-carbon bonds and form an extended conjugated network. The more preferred CMPs are poly(aryleneethynylene) networks.

Examples of poly(aryleneethynylene) polymers include those in which the arylene moiety is selected from phenylene, bisphenylene, diradicals of fused aromatic rings such as nephthylene, anthracene, pyrene, spirofluorene and the like.

Specific examples of simple CMPs include CMP-0, CMP-1, CMP-2, CMP-3, CMP-4 and CMP-5.

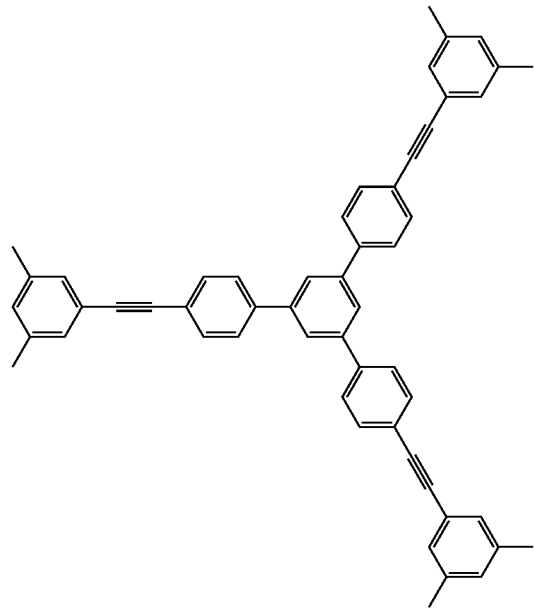

CMP-0

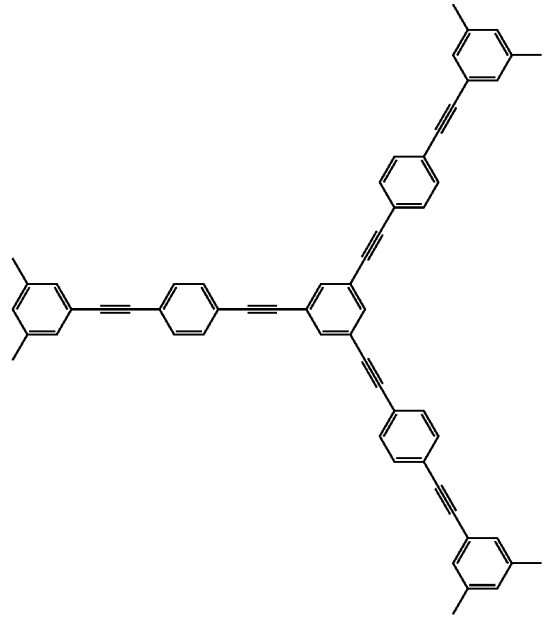

CMP-1

CMP-2
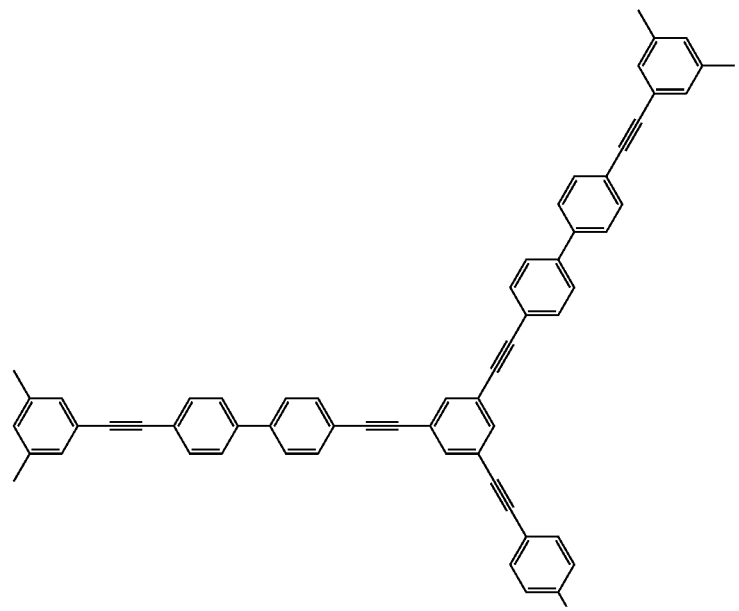
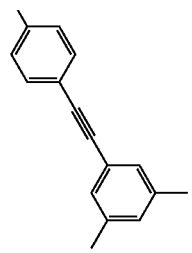
CMP-3
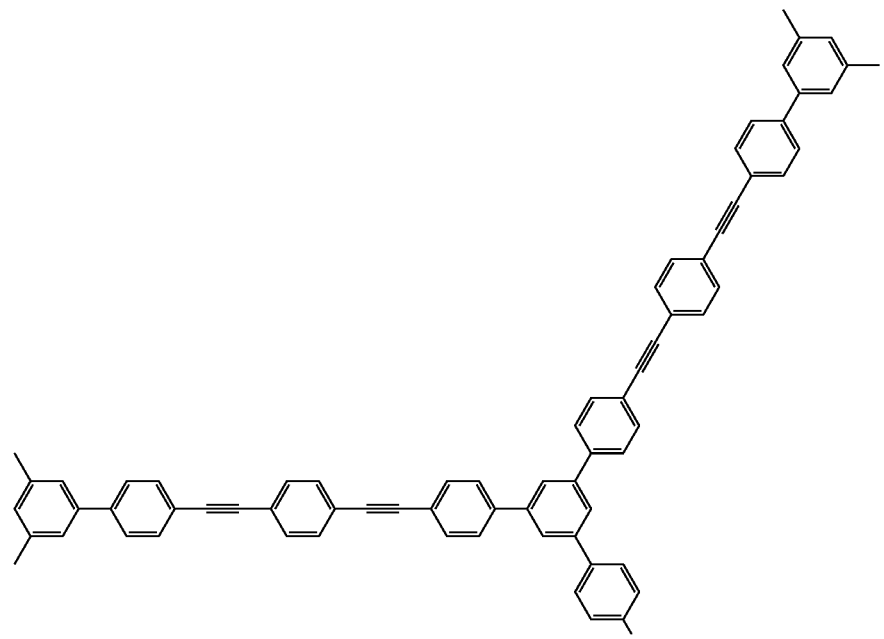

-continued

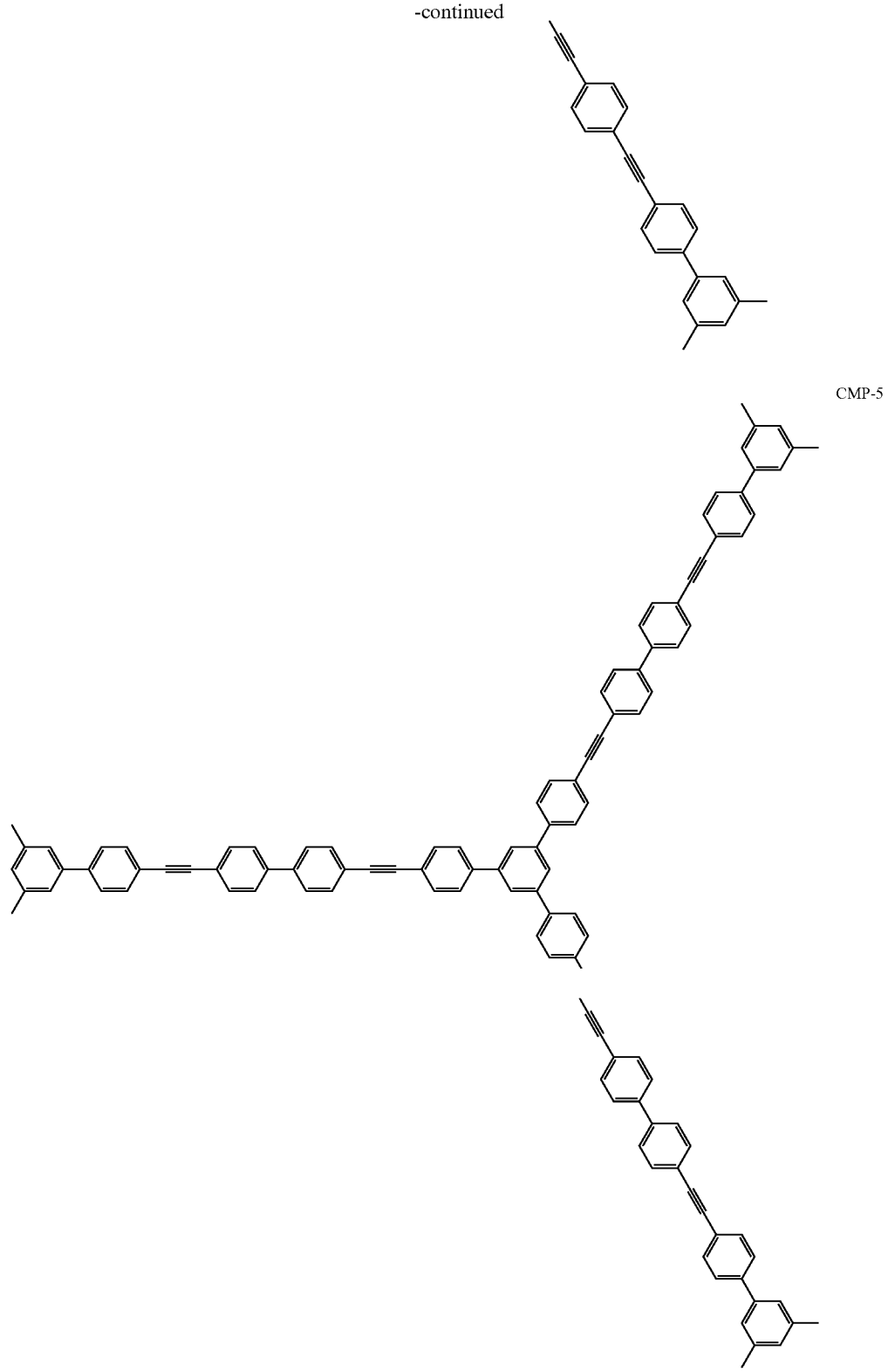

CMP-5

The CMPs may be considered as made up of struts, the liner portions and knots or nodes made up of the polyfunctional groups such as benzene groups having three attached struts. Generally speaking the CMPs with the shortest struts such as CPM-0 have a higher surface area than the corresponding CPMs with longer struts such as CPM-3 or CPM-5. CMPs may also comprise a wide range of functional groups such as one or more selected from the group consisting of alcohol, amine, halo, nitro, pyridyl and methyl.

A detailed review of CPMs and the variation in structure and preparation is provided by Xu et al, "Conjugated microporous polymers: design, synthesis and application" *Chem. Soc. Rev.,* 20013, 42, 8012

The term polymers of intrinsic microporosity (PIM) refers to polymers that demonstrate microporosity without possessing a polymer network structure. The term "intrinsic viscosity" in polymers is defined as a continuous network of interconnected voids which form as a direct result of the shape and rigidity of the component macromolecules. They have a ladder type structure comprising planar groups and rigid linkers which hold planar groups in a contorted non-coplanar orientation so that they cannot pack space efficiently. Examples of PIMs include polyphtalocyanines, polyspirobisindanes, polyaromaticdioxanes and polyimides.

Specific examples of PIMs include copolymers of a tetra-hydroxyl aromatic monomer and a tetra-halo aromatic monomer. The aromatic component of the monomer may comprise from 1 to 6 aromatic rings which may be fused, joined by rigid links or both. Specific examples of PIMs of the polyaromatic dioxane type are disclosed by McKeown et al in U.S. Pat. No. 8,056,732, Du et al in U.S. Pat. No. 8,686,104 and McKeown in Review Article "Polymers of Intrinsic Microporosity" *International Scholarly Research Network ISRN, Materials Science* Vol 2012, Article ID 513986 (16 pages).

In one set of embodiments the polymers of intrinsic microporosity are selected from the group consisting of (i) of aromatic dioxane type formed as copolymers of aromatic monomer containing 4 or more hydroxyl group such as tetrahydroxyl aromatic monomers and monomers containing 4 or more halo or cyano groups such as tetra-halo aromatic monomers or tetra cyano aromatic monomers; and (ii) polyimides formed as copolymers of aromatic di-anhydrides and aromatic diamines. The aromatic groups in the copolymers are generally independently mono or polynuclear aromatics containing one to six aromatic rings which when there are more than one aromatic ring may be fused or linked by one or more single carbon linking groups which may be secondary, tertiary or quaternary substituted carbon linking groups.

Examples of the preparation of the PIMs of aromatic dioxane type and polyimide type are shown in the scheme below:

Scheme 1

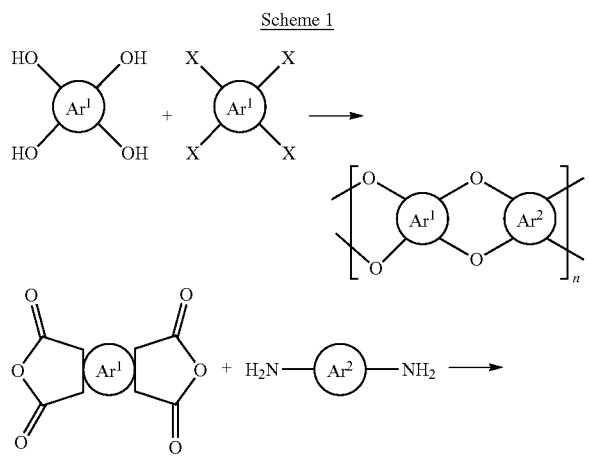

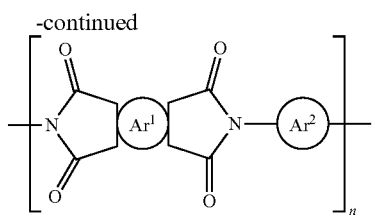

wherein $Ar^1$ and $Ar^2$ are independently selected aromatic groups containing one to six aromatic rings which when there are more than one aromatic ring may be fused or linked by one or more single carbon linking groups which may be secondary, tertiary or quaternary substituted carbon linking groups;

X is —CN or halo and preferably CN or fluoro; and n is the number of repeating units. The number of repeating units may vary widely depending on the reaction conditions and specific reagents. For example in one embodiment n may be, for example, from 20 to 10,000.

Specific examples of the tetra hydroxyl aromatic monomers include monomers selected from the group consisting of 5,5',6,6'-tetrahydroxy-3,3,3',3'-tetramethylspirobisindane (TTSBI or SBI), 2,2',3,3'tetrahydroxy-1,1'dinaphthyl (THDN), 9,9-bis(3,4-dihydroxyphenyl)fluorene and 9,10-etheno-3,4,6,7-tetrahydroxy-9,10-dimethyl-9,10dihydroanthracene. Copolymers of TTSBI are particularly preferred.

Examples of tetra-fluoro aromatic monomer include monomers of formula:

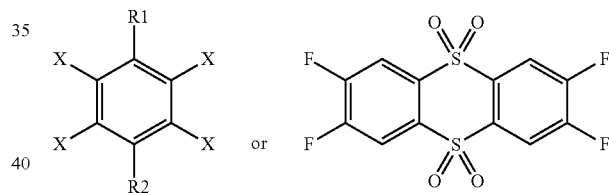

wherein X is halo, preferably fluoro and $R^1$ and $R^2$ are independently selected from —CN, —$CF_3$, $CH_3CH_2CH_2SO_2$—, $PhSO_2$ and p-$CH_3O$-Ph-$SO_2$—. Specific examples of tetrafluoroaromatic include 2,3,5,6-tetrafluoroterephthalonitrile (TFTPN), hepta fluoro-p-tolylphenylsulfone (HFTPS), 1,2,4,5-tetrafluoro-3,6-bisphenylsulfonylbenzene (TFBPSB), 1,2,4,5-tetrafluoro-3,6-bis(bis(methoxy-4-phenylsulfonyl)benzene (TFBMPSB), 1,2,4,5-tetrafluoro-3,6-bis(ethylsulfonyl)benzene (TFBESB) and 2,3,7,8-tetrafluoro-5,5',10,10'tetraoxidethianthrene (TFTOT).

Examples of PIMs and the monomers used in their preparation are disclosed by McKeown in Review Article "Polymers of Intrinsic Microporosity" *International Scholarly Research Network ISRN, Materials Science* Vol 2012, Article ID 513986 (in particular Tables 1 and 2) and by Carta et al "An Efficient Polymer Molecular Sieve for Membrane Gas Separations" Science Vol 339 p 303-306 the contents of which are herein incorporated by reference. Specific examples of the PIMs reviewed by McKeown include PIM-1, a copolymer of TTSBI and TFTPN., PIM-2, PIM-3, PIM-4, PIM-5, PIM-6, PIM-7, PIM-8, PIM-9, PIM-10, cardo-PIM-1, cardo-PIM-2, PIM-CO-100 and PIM-R1, PIM-R2, PIM-R3, PIM-R4, PIM-R5, PIM-R6, PIM-R7 and PIM-PI-1. Carta et al disclose PIM-SBI-TB (TB is Tröger's Base-2,8-dimethyl-6H,12H-5,11-methanodibenzo[b,f]diazocine).

Porous aromatic framework polymers are a class of MOPs characterised by a rigid aromatic open framework. PAFs are generally derived from homocoupling of monomers comprising four aromatic groups arranged about a central atom or group. In a preferred embodiment the aromatic groups are tetrahedrally arranged about a central quaternary carbon or silicon.

The preferred PAFs are polymers of terakis(4-substitutedphenyl)methane wherein the substituent is a substituent facilitating homocoupling under the chosen homocoupling conditions such as tetrakis(4-bromophenyl)methane coupled by Yamamoto coupling. Another PAF is a polymer of tetrakis(bromophenyl)silane prepared by Yamamoto coupling. PAFs and their preparation are described in a number of publications including Gaab et al. U.S. Pat. No. 8,703, 644; Ben et al., 2009, *Angew. Chem. Int'l Ed.* 48:9457; Ren et al., 2010, *Chem. Commun.* 46:291; Peng et al., 2011, *Dalton Trans.* 40:2720; Ben et al., 2011, *Energy Environ. Sci.* 4:3991; Ben et al., *J. Mater. Chem.* 21:18208; Ren et al., *J. Mater. Chem.* 21: 10348; Yuan et al., 2011, *J. Mater. Chem.* 21: 13498; Zhao et al., 2011, *Chem. Commun.* 47:6389; Ben & Qiu, 2012, *Cryst. Eng. Comm.*, DOI: 10.1039/c2ce25409c; Dawson et al. "Nanoporous organic polymer networks" *Progress in Polymer Science*, 37 (2012) 530-563. PAFs show high surface areas and excellent physicochemical stability, generally with long range order and, to a certain extent, an amorphous nature.

Non-limiting examples of PAFs include PAF-1 (also known as PAF-302), PAF-3, PAF-4, PAF-11 (also known as PAF-304), PAF-301, PAF-303, JUC-Z1, JUC-Z2, PPN-4, PPN-5, PPN-6-S0 3H, PPN-6-SO3U, or any mixtures thereof. PAFs useful within the compositions of the invention may be obtained from commercial sources or prepared according to methods known to those skilled in the art (Ben & Qiu, 2012, *Cryst. Eng. Comm.*, DOI: 10.1039/c2ce25409c).

Metal-organic frameworks (MOFs) also referred to as porous coordination polymers are a class of crystalline porous materials composed of metal ions or clusters which form nodes (also referred to as secondary building units (SBUs)) coordinated to organic linker molecules to form porous structures. The organic linkers are generally at least bidentate to allow the formation of a one-, two- or three-dimensional extended structure. The coordination-nodes can contain one or more than one metal ion.

In one set of embodiments the particles of MOF comprise a metal ion or cluster of ions and comprises one or more metals selected from elements of groups Ia, IIa, IIIa, Iva to VIIIa and Ib to VIb of the periodic table.

The organic linkers may comprise an aromatic moiety comprising from 1 to 5 aromatic rings and one or more binding ligand groups selected from the group consisting of $CO_2H$, $CS_2H$, $NO_2$, $SO_3H$, $Si(OH)_3$, $Ge(OH)_3$, $Sn(OH)_3$, $Si(SH)_4$, $Ge(SH)_4$, $Sn(SH)_3$, $PO_3H$, $AsO_3H$, $AsO_4H$, $P(SH)_3$, $As(SH)_3$, $CH(RSH)_2$, $C(RSH)_3$, $CH(RNH_2)_2$, $C(RNH_2)_3$, $CH(ROH)_2$, $C(ROH)_3$, $CH(RCN)_2$, $C(RCN)_3$, wherein R is an alkyl group having from 1 to 5 carbon atoms, or an aryl group consisting of 1 to 2 phenyl rings, and $CH(SH)_2$, $C(SH)_3$, $CH(NH_2)_2$, $C(NH_2)_2$, $CH(OH)_2$, $C(OH)_3$, $CH(CN)_2$ and $C(CN)_3$.

In a preferred set of embodiments the organic ligand component of the MOF comprises at least one a compound selected from the group consisting of substituted or unsubstituted mono or polynuclear aromatic di-, tri- and tetra-carboxylic acids, esters or amines; and substituted or unsubstituted heteroaromatic di-, tri- and tetra-carboxylic acids, esters or amines which may be mononuclear or polynuclear.

More preferred organic ligand compound comprises at least one selected from the group consisting of benzene tricarboxylate and in particular 1,3,5-benzene tricarboxylate (BTC). ADC (acetylene dicarboxylate), NDC (naphthalene dicarboxylate), BDC (benzene dicarboxylate), ATC (adamantine tetracarboxylate), BTB (benzene tribenzoate), MTB (methane tetrabenzoate) and ATB (adamantine tribenzoate).

Particularly preferred examples of MOFs are selected from the group consisting of UIO-66, UIO-67, HKUST-1, PCN-14, Al-Fumarate and MOF-210.

The composition may contain one or more additives in addition to particles of amorphous MOP and particles of MOF. Examples of further components may be selected from the group consisting of binders, fillers and the like. The presence of binders may be useful in some instances. Examples of suitable binders include one or more selected from the group consisting of carbon-based materials (e.g., graphite), polymers (e.g., polyvinylalcohol) and resin materials typically where present the other components will constitute no more than 20% by weight of the composition and preferably no more than 10% by weight of the total composition. In one set of embodiments the other materials constitute less than 5% by weight or in other words the amorphous MOP and MOF constitute at least 90% or at least 95% by weight of the gas storage composition.

In a set of embodiments there is provided a process for preparation of a composition for gas storage in the form of a composite material comprising providing particles of amorphous MOP and particles of MOF, mixing the particles, optionally with milling, to form a homogenous mixture thereof and compressing the mixture to fuse and shape the particles and form a composite. The process may comprise pressing or extruding the homogenous mixture of particles. The mixture may be fused into a composite in a process comprising subjecting the particulate mixture to a temperature in the range of 10° C. to 300° C. and pressure in the range of 1 to 50 tonne.

In a further set of embodiments there is provided a system for gas storage comprising a container having an entrance and optionally a separate exit for the gas, to allow gas to enter and exit the container and a composition for gas storage as hereinbefore described within the container. The storage capacity for the gas in the container may generally be improved by cooling the container and/or composition for gas storage within the container for introduction of the gas. Further, the delivery of gas from the container may be enhanced by heating the container and/or composition for gas storage while expelling the gas from the container. In one embodiment a magnet within or on the outside of the container may be used to generate heat during delivery of gas from the container. One of the significant advantages of the composition for gas storage is that it allows the container to have a range of shapes and to be formed of a plastic material.

With reference to FIG. 1, a schematic illustration of an embodiment of the gas storage system is provided. Gas storage system 10 includes container 12 which includes storage cavity 14.

Gas storage material 16 is positioned within container 12 filling at least a portion of gas storage cavity 14. Gas storage material 16 is in the form of pellets of a composite of fused composition of an intimate mixture of MOF particles and amorphous MOP particles as hereinabove described. Gas storage system 10 further includes conduit 18 through which gas is introduced and removed. In another variation of the present invention, gas storage system 10 includes separate conduits for introducing gas and for removing gas. Gas storage system 10 may also include valve 20 for closing off container 12 as needed. In one variation, after gas is introduced into container 12 and gas storage material 16 within the container 12, the valve 20 is closed off. Subsequently, when the gas is needed the stored gas is released by opening the valve 20. In one set of embodiments uptake of gas is enhanced by cooling applied by temperature regulators 22, 24 during introduction of the gas. In a further embodiment delivery of stored gas from storage material 16 is enhanced by heating gas storage material 16 via temperature regulators 22, 24. In another variation, the stored gas is removed under reduced pressure provided by pump 26 acting through conduit 28 and made available for subsequent use via outlet conduit 30.

The composition for gas storage may be used in storage of a range of gases. In one set of embodiments the gas stored is selected from the group consisting of hydrogen, natural gas, methane, saturated and unsaturated hydrocarbons including: propane, butane, isobutane as well as: phosphine, helium, oxygen, argon, hydrogen sulphide, biogas, arsine, boron trifluoride, carbon monoxide, diborane, trimethylboron carbon dioxide, Dichlorosilane, Disilane, Germane, Methylsilane, Silane, Silicon Tetrachloride, Germanium Tetrafluoride, Silicon Tetrafluoride, Trichlorosilane hydrogen bromide, hydrogen chloride, chlorine, iodine, nitrogen, air, Ammonia, Sulphur Dioxide, Tungsten Hexafluoride, Nitrous Oxide, Halocarbon 116, Halocarbon 14, Halocarbon 218, Halocarbon 23, Halocarbon 32, Halocarbon RC318, Hydrogen bromide, Hydrogen chloride, Hydrogen fluoride, Chlorine, Sulphur hexafluoride, Boron Trichloride, Nitrogen Trifluoride, Methylbromide, Refrigerant gases e.g. R134a, Fumigant gases, Pesticide gases such as insecticide, and herbicidal gases and noble gases such as Xenon, Radon.

The invention will be demonstrated with reference to Examples. It is to be understood that the examples are provided by way of illustration of the invention and that they are in no way limiting to the scope of the invention.

Examples

Polymer Synthesis
Preparation of Hypercrosslinked MOP
Dichloroxylene (DCX, 2.5 g), an aromatic monomer, was dissolved in anhydrous dichloroethane (DCE, 10 mL), a DCE solution of FeCl3 was added under nitrogen. The resulting mixture was heated to 80° C. The resulting brown polymer precipitate was washed once with water, three times with methanol (until the filtrate was clear), and with diethyl ether followed by drying for 24 h at 60° to provide a particles of polymer (PDCX).

Preparation of Crosslinked PIM for Use as a MOP Component
A PIM (specifically PIM-1) for use in preparing composite of the invention may be prepare in accordance with the procedure in McDonald et al "Using intermolecular interactions to crosslink PIM-1 and modify its gas sorption properties" *J. Mater. Chem. A*, 2015, 3, 4855.

Preparation of PAF for Use as a MOP Component
PAF-1 may be prepared by the method described by Zhu and co-workers Angawandte Chemie 2009, 121, 9621 and in "Hypercrosslinked Additives for Ageless Gas-Separation Membranes", *Angewandte Chemie.*, Vol 55 (6) Feb. 5, 2016 1998-2001. The process provides PAF-1 particles as an off white powder of particle size typically in the range of 100-200 nm.

MOF Synthesis
CuBTC (HKUST-1)
The MOF was prepared according to the protocol from (Marx et al. 2011 *Journal of catalysis* Vol 281, Issue 1, 1 Jul. 2011 pp 76-87;

1.126 g (4.84 mmol) of $Cu(NO_3)_2 \cdot 2.5H_2O$ was dissolved in 25 ml of distilled water, and 0.491 g of benzene-1,3,5-tricarboxylic acid ($H_3BTC$; 2.33 mmol) was dissolved in 25 ml of N,N-dimethylformamide (DMF). The two solutions were combined in a 100-ml round-bottom flask that was put in a pre-heated oil bath at a temperature of 100° C. for 4 h. The blue precipitate was then filtered off, washed thoroughly with DMF and water to remove residual precursor species, and dried at 200° C. in order to remove the DMF solvent.

UIO-66
Synthesis protocol from (Katz et al. *Chem Comm;* 2013, 49 9449-9451.

All UiO materials were synthesized using the following general procedure and the amounts of reagents listed in Table S1. An 8-dram vial was loaded with ZrCl4, one third of the DMF, and concentrated HCl before being sonicated for 20 minutes until fully dissolved. The ligand and the remainder of the DMF were then added and the mixture was sonicated an additional 20 minutes before being heated at 80° C. overnight (BPDC was not completely soluble under these conditions). The resulting solid was then filtered over a fine frit and washed first with DMF (2×30 mL) and then with EtOH (2×30 mL). The sample was filtered for several hours to remove all residual solvent. With the exception of the supercritically dried samples, the samples were activated by first heating to 90° C. under vacuum until a pressure of 100 mtorr was reached.

Flow synthesis has also been reported for several MOFs of interest including the Al Fumarate as used herein:

M. Rubio-Martinez, M. P. Batten, A. Polyzos, K. Constanti Carey, J. I. Mardel, K. Seng Lim and M. R. Hill. "Versatile, High Quality and Scalable Continuous Flow Production of Metal-Organic Frameworks", *Sci. Rep.* 4 Article No. 5443 (2014) DOI: 10.1038/srep05443, (2014)

Example 1

Once synthesised, the materials are pressed or shaped with the primary aim being to increase their volumetric uptake of gas. Composite pellets consisting of a MOF such as CuBTC are prepared by mixing the MOF with a porous polymer (such as PDCX, a hypercrosslinked MOP).

The pellets contained 20% polymer to MOF. The particle size of the polymer was approximately 250 nm. The particles of CuBTC synthesized are 2 μm. If the samples in Table 1 below state "milled and pelleted" the mixture were pressed by approximately 8 tonnes pressure using an FTIR press (normally used for preparation of KBr discs for IR spectroscopy) which is a hydraulic press. The result is a composite pellet that consists of fused particles of MOF and MOP.

TABLE 1

Composite preparation.

| Number | Composition | Treatment | Density g/cm$^3$ | Surface area m$^2$/cm$^3$ | Surface area m$^2$/g |
|---|---|---|---|---|---|
| 1 | Bright Black (a control) | N/A; activated at 150° C. for 24 hrs | 1.04 | 977.6 | 940 |
| 2 | PDCX + MOF CuBTC (small pellet) | Milled and pelleted; activated at 150° C. for 24 hrs | 1.18 | 566.4 | 480 |
| 3 | PDCX + MOF CUBIC | Ground and pelleted; activated at 150° C. for 24 hrs | 0.53 | 487.6 | 920 |
| 4 | PDCX + MOF CuBTC (disc pellet) | Milled and pelleted; activated at 150° C. for 24 hrs | 1.1 | 826.1 | 751 |
| 5 | Carbonised PDCX + MOF CuBTC (disc pellet) | Milled and pelleted; carbonised at 500° C. for 24 hours; activated at 150° C. for 24 hrs | 0.6 | 499.3 | 833 |

Example 2—High Performance Composite Materials Using MOF/Porous Polymer Mixtures Particles of MOF, such as HKUST-1, and MOP, such as PCDX, were intimately mixed and pressed at 2 bar in a 13 mm die. Mixtures were made of MOF and MOP with a PVA binder (relative masses of each porous material, with 50 mg PVA dissolved in water for a typical total pellet mass of 600 mg). These mixtures were mixed in a pestle and mortar. These materials were then pressed under the conditions described above, to form composites comprising a fused intimate mixture of particles, and dried under vacuum to achieve activation of the material surface. Bulk densities of the pellets were measured post-drying using calipers and skeletal densities were measured by Helium pycnometry. High pressure gas isotherms were measured using a PCT-Pro-2000 instrument supplied by Setaram. Other MOF and MOP composites were prepared by the same process and the measurement results are shown in Tables 2 to 4.

Note that bulk densities of the final materials were used to calculate the volumetric adsorption capacities. Typical reported capacities in the literature are crystallographic densities which cannot typically be translated to applications of significant scale.

TABLE 2

Bulk density

| Sample | Density (g/cm$^3$) |
|---|---|
| Al fumarate particles | 0.288 ± 0.03 |
| CuBTC particles | 0.384 ± 0.03 |
| 90 wt % CuBTC/10 wt % PDCX | 0.73 ± 0.04 |
| 50 wt % CuBTC/50 wt % PDCX | 0.75 ± 0.09 |
| 25 wt % CuBTC/75 wt % PDCX | 0.46 ± 0.02 |

TABLE 3

Bulk density

| Sample | Density (g/cm$^3$) |
|---|---|
| 50:50 Al fumarate PDCX pellet | 0.559 |
| PDCX particles | 0.220 |

TABLE 4

Skeletal density

| Sample | Density (g/cm$^3$) |
|---|---|
| CuBTC pellet | 1.9672* |
| 90 wt % CuBTC/10 wt % PDCX | 2.019 ± 0.03 |
| 50 wt % CuBTC/50 wt % PDCX | 1.749 ± 0.02 |
| 25 wt % CuBTC/75 wt % PDCX | 1.525 ± 0.01 |

Figure 2:
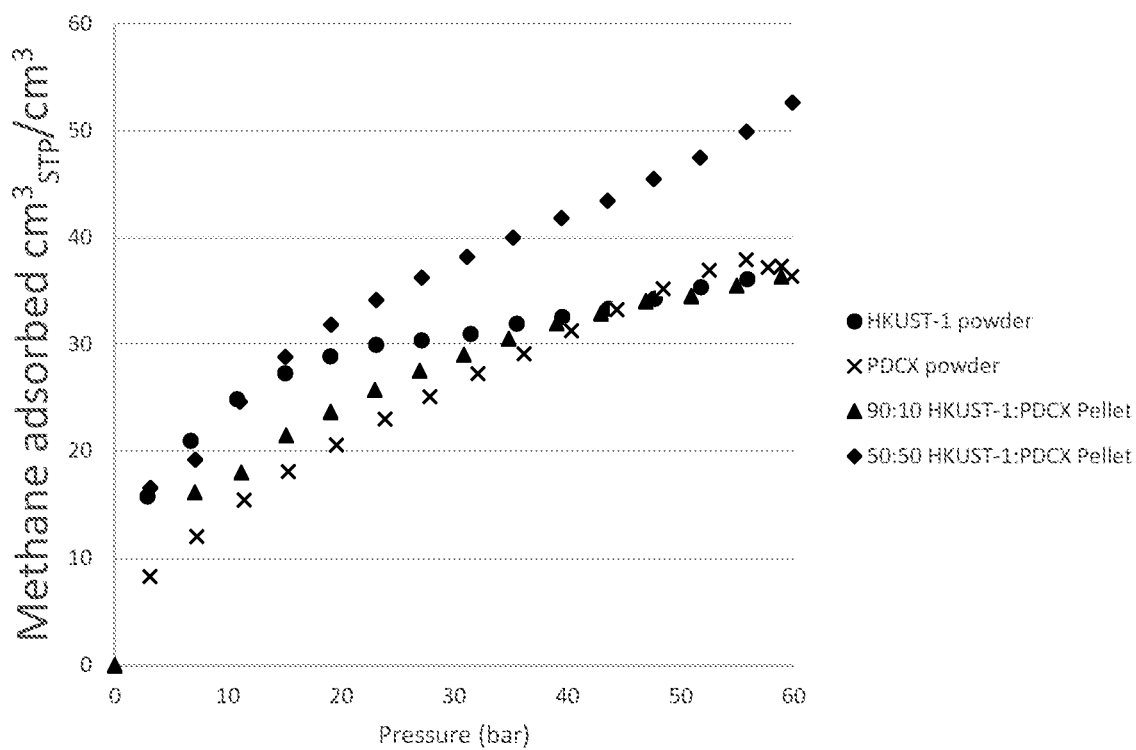
FIG. 2 is a graph comparing variation of methane absorption ($cm^3{}_{STP}/cm^3$) with pressure (bar) for individual HKUST-1 and PDCX particle compositions with compressed pellets of each of 90:10 HKUST-1:PDCX and 50:50 HKUST-1:PCDX at a temperature of 298K.

FIG. 2 of the drawings compares the methane adsorption of pellets comprising compressed powder particles of a mixture pf MOF (HKUST-1) and hypercrosslinked MOP (PDCX) with powders of each of MOF (HKUST-1) and MOP (PDCX), that is, no mixture.

This data clearly demonstrate the pressed composite pellets have higher volumetric uptakes than the particles themselves, particularly with the inclusion of higher PDCX-0 despite the lower density of those pellets. It is clear that there are different shapes of the isotherms of PDCX and MOFs, which can be attributed to the fact that the MOP (PDCX) swells in the presence of gas.

Figure 3:
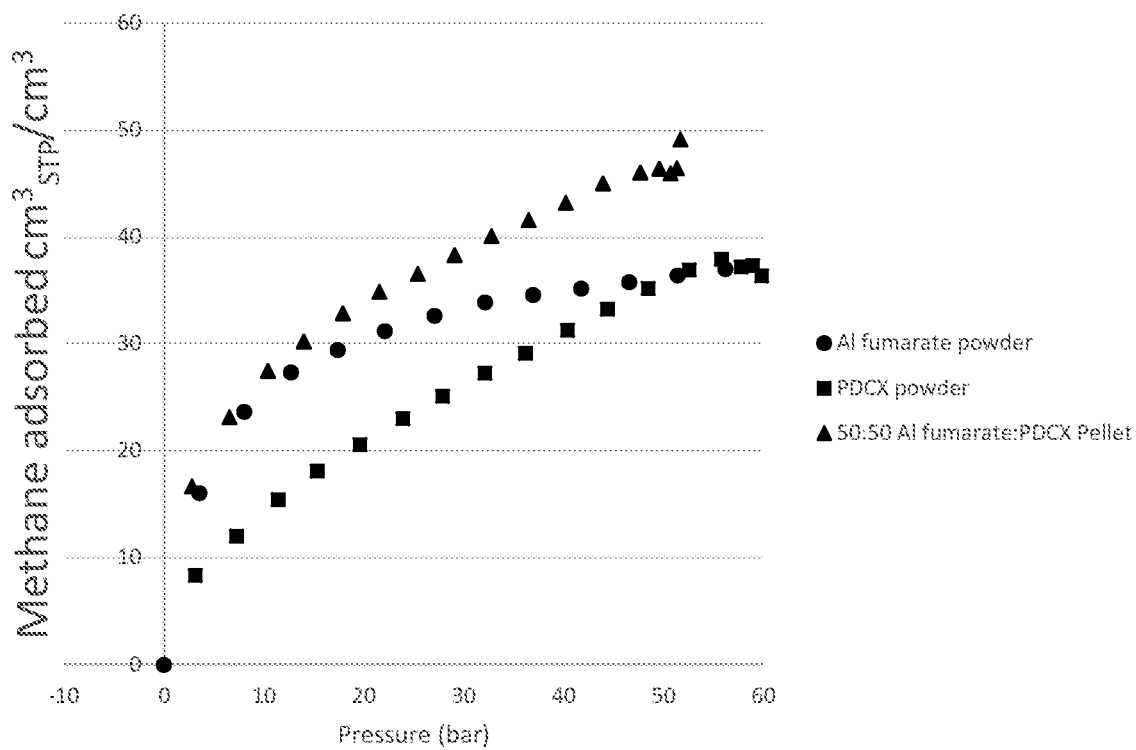
FIG. 3 is a graph comparing methane absorption ($cm^3_{STP}/cm^3$) for individual Al fumarate and PCDX particle compositions with a compressed pellet composition of 50:50 Al fumarate:PCDX particles at a temperature of 298K.

FIG. 3 compares the methane adsorption of pellets formed by compression of an intimate mixture of MOF (Al Fumarate) and MOP (PDCX) with particles of each of MOF (Al Fumarate) and MOP (PDCX) (i.e. no mixture).

This data clearly demonstrate the pressed composite pellets have higher volumetric uptakes than the individual particles themselves. The shape of the mixed pellets also corresponds more closely to the MOP system.

Figure 4:
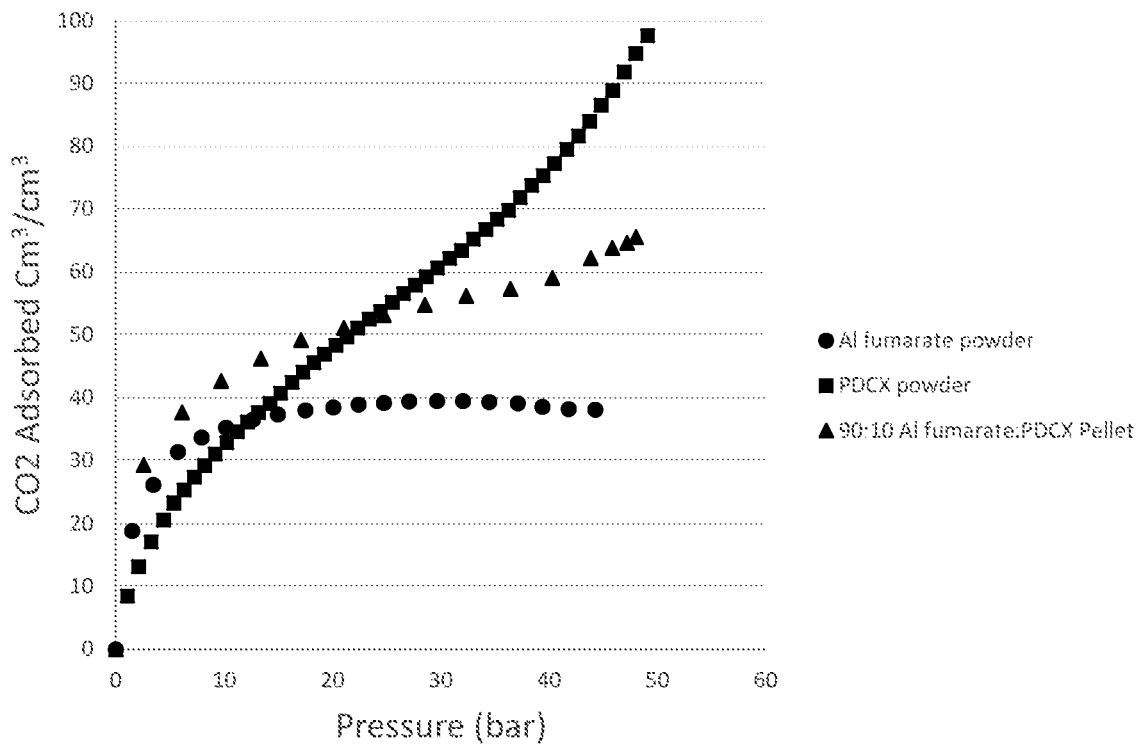
FIG. 4 Is a graph comparing the variation of carbon dioxide adsorption of ($cm^3/cm^3$) with pressure (bar) for individual Al Fumarate and PDCX particle compositions with compressed pellets of 90:10 Al Fumarate:PDCX particles at a temperature of 298K.

FIG. 4 compares the carbon-dioxide adsorption of pellets formed by compression of intimate mixtures of MOF (Al Fumarate) and MOP (PDCS) with powders of MOF and MOP.

This data clearly demonstrates that the pressed composite pellets of MOP and MOF can have a much better capacity for CO2 storage than the MOF alone. Despite having a low percentage composition of PDCS (10%) the volumetric capacity of the system is increased compared to that of the MOF, and the shape of the isotherm is also clearly altered.

Example 3—High Performance Composite Materials Using MOF/Porous Polymer Composites Composites may be prepared in accordance with the procedure of Example 2 using a range of MOF and MOP combination is accordance with the results shown in Table 5.

TABLE 5

| MOF | MOP | Weight Ratio range |
|---|---|---|
| UIO-66 | PIM-1 | 10:90 to 90:10 |
| CuBTC (HKUST-1) | PIM-1 | 10:90 to 90:10 |
| Al-Fumarate | PIM-1 | 10:90 to 90:10 |
| UIO-66 | PAF-1 | 10:90 to 90:10 |
| CuBTC (HKUST-1) | PAF-1 | 10:90 to 90:10 |
| Al-Fumarate | PAF-1 | 10:90 to 90:10 |

High performance composite materials comprising the above mentioned composition may be used as gas storage materials is a gas storage system such as that described above with reference to FIG. 1.

Example 4—Evidence for Swelling Polymers in Natural Gas and Carbon Dioxide

Swelling Experiments

The PCDX polymer was swollen in a C1/C3 gas mixture. The gas mixture comprised 90% of $CH_4$, and 10% of $C_3H_8$.

The polymer was lightly compressed into a small glass vial (2 mL). The vial was placed in a high pressure autoclave (Parr) equipped with a sapphire glass window. Images were taken before and after pressurization to 36 bar and used to examine the degree of expansion of the polymer.

Evidence for selling PCDX polymers in CO2: Swelling Experiments. The polymer was swollen in CO2 from 1 bar to 50 bar. The approximate pellet volume was 230±20 at 1 bar and 334±20 at 50 bar.

Details of swelling experiments on p-DXC in C1/C3 mixtures are provided by Lau et al "Hypercrosslinked Additives for Ageless Gas-Separation Membranes", *Angewandte Chemie.*, Vol 55 (6) Feb. 5, 2016 1998-2001.

Example 5

A significant advantage of the invention is that it allows different MOFs to be used in the composite composition according to the desired heat of adsorption for the required gas. This allows the overall heat of adsorption of the composite to be tuned by selection of the appropriate MOF particles for forming a composite with the microporous organic polymer.

Figure 5:
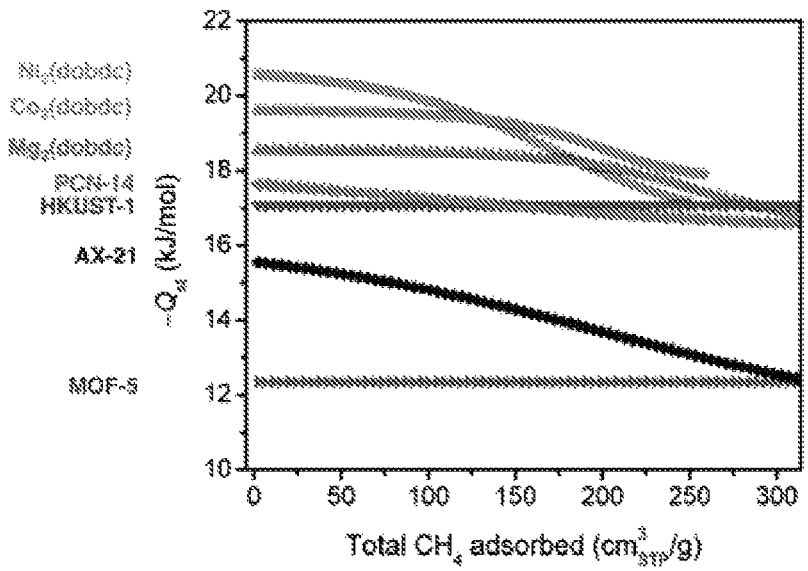
FIG. 5 is a graph showing the heats of adsorption ($-Q_{st}$ in kj/mol) of methane at 25° C. as a function of the total amount of methane adsorbed for a range of different MOFs. The MOFs listed at the left hand side of the graph identify the relevant plots from the left hand side of the plots.

As an illustration of the applicability of a range of MOFs that can be chosen to use in this invention, FIG. 5 shows the isosteric heats of adsorption of a range of available MOFs as a function of the total methane adsorbed [DOI: 10.1039/C3SC52633*J Chem. Sci.*, 2014, 5, 32-51, Evaluating metal-organic frameworks for natural gas storage, Jarad A. Mason, Mike Veenstra and Jeffrey R. Long]

Example 6

Pellets, or shaped materials prepared in accordance with Example 2 may be filled into an open gas storage vessel which is then closed with a valve securely fitted onto the bottle. This storage vessel may be a conventional cylindrical storage vessel or a different aspect ratio and shape depending on end-use requirement. An external gas supply of a gas, particularly methane, C1/C3 mixture or carbon dioxide may be used to charge the container with gas. The heat of adsorption caused by gas charging into the porous materials may be transferred away from the tank through a heat exchange system to facilitate and expedite charging. Pellets of the composite swell with the PCDX significantly enhancing the uptake of gas by swelling to fill the interstices of MOF particles and significantly increasing the surface area available for gas sorption. An example of a suitable gas storage system is described above with reference to FIG. 1. The composites described in the above examples may be loaded into such as gas storage system as pellets comprising a fixed mixture of MOF and MOP particles to provide the gas storage material (16) described with reference to FIG. 1.

The invention claimed is:

1. A composition for gas storage comprising a mixture of particles of amorphous microporous organic polymer (MOP) and particles of a metallic organic framework (MOF), wherein the amorphous MOP is a hypercrosslinked polymer comprising optionally substituted aryl groups covalently linked by methylene bridging groups ($CH_2$) to form —(Ar—$CH_2$—Ar—$CH_2$)$_n$— wherein n is the number of repeating units.

2. A composition according to claim 1 wherein the particles of amorphous MOP has a BET surface area of at least 600 $m^2/g$.

3. A composition according to claim 1 wherein the weight ratio of MOP to MOF in the mixture is in the range of from 1:20 to 20:1.

4. A composition for gas storage according to claim 1, wherein the particles of MOP and particles of MOF have an average particle size of no more than 0.5 mm.

5. A composition for gas storage according to claim 1, wherein the composition is in the form of a particulate composite of the particles of amorphous microporous organic polymer (MOP) and particles of a metallic organic framework (MOF) wherein the composite comprises the mixture fused under pressure.

6. A composition for gas storage according to claim 5, wherein the composite is in the form of shaped articles of the fused mixture having a minimum dimension of at least 1 mm.

7. A composition for gas storage according to claim 1, wherein the particles of amorphous MOP are disposed in interstitial spaces between MOF particles and are swellable in the presence of the gas to be stored.

8. A composition for gas storage according to claim 1, wherein the amorphous MOP comprises one or more materials selected from the group consisting of polymers of intrinsic microporosity (PIMS), porous aromatic frameworks (PAFs) and hypercrosslinked polymers.

9. A composition for gas storage according to claim 1, wherein the methylene bridging groups form covalent links between two adjacent aryl groups to form a six membered carbocyclic ring that is fused with the aryl rings.

10. A composition for gas storage according to claim 1, wherein the hypercrosslinked polymer is prepared by polymerisation of a substituted aryl monomer comprising at least two chloromethylene groups.

11. A composition for gas storage according to claim 1, wherein the microporous organic polymer is prepared by polymerisation of an optionally substituted aryl monomer with an external crosslinker preferably selected from monochlorodimethyl ether or dimethyl formal or mixtures thereof, preferably by Friedel Crafts catalysed polymerisation.

12. A composition for gas storage according to claim 1, wherein the hypercrosslinked polymer is formed by post polymerisation crosslinking of polymers containing aryl monomers preferably selected from optionally substituted vinylbenzyl chloride, vinylbenzyl chloride-co-divinylbenzene copolymers, vinylbenzylchloride copolymers having at least two reactive groups to provide a rigid covalent link between two aryl groups.

13. A composition for gas storage according to claim 1, wherein the hypercrosslinked polymer is formed by post polymerisation crosslinking using an external cross-linker of polymers containing aryl monomers.

14. A composition for gas storage according to claim 1, wherein the optionally substituted aryl groups comprise an aryl selected from the group consisting of carbocyclic aryl selected from the group consisting of benzene, biphenyl, naphthylene, tetrahydronaphthylene, idene, azulene, anthracene and heterocyclic aryl selected from the group consisting of furanyl, thiophenyl, 2H-pyrrolyl, pyrrolinyl, oxazolinyl, thiazolinyl, indolinyl, imidazolidinyl, imidazolinyl, pyrazolyl, pyrazolinyl, isoxazolidinyl, isothiazolinyl, oxadiazolinyl, triazolinyl, thiadiazolinyl, tetrazolinyl, pyridinyl, pyridazinyl, pyrimidinyl, pyrazinyl, triazenyl, indolyl, isoindolinyl, benzimidazolyl, benzoxazolyl, quinolinyl and isoquinolinyl and optional substituents are selected from the group consisting of $C_1$ to $C_4$ alkyl, $C_2$ to $C_4$ alkenyl, halo-$C_1$ to $C_4$ alkyl, amino, $C_1$ to $C_4$ alkylamino, di-($C_1$ to $C_4$ alkyl)amino and sulfonate.

15. A composition for gas storage according to claim 1, wherein the hypercrosslinked polymer comprises a repeating unit of at least one of formula I or formula II:

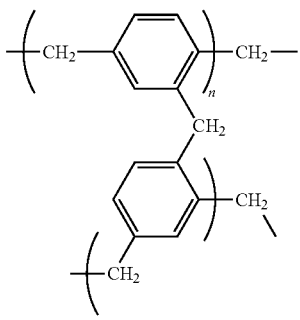

I

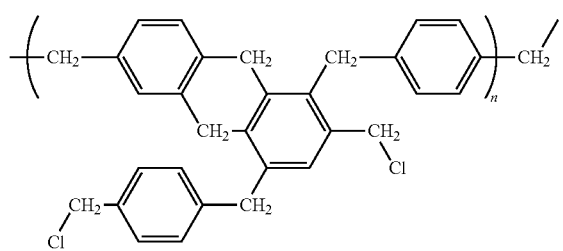

II wherein n represent the number of repeating units.

16. A composition for gas storage according to claim 1, wherein the MOF comprises a metal ion or cluster comprising one or more metals selected from elements of groups Ia, IIa, IIIa, Iva to VIIIa and Ib to VIb of the periodic table.

17. A composition for gas storage according to claim 16, wherein the MOF comprises one or more organic linkers selected from the group consisting of substituted or unsubstituted mono- or poly-nuclear aromatic di-, tri- and tetra-carboxylic acids, esters or amines; and substituted or unsubstituted heteroaromatic di-, tri- and tetra-carboxylic acids, esters or amines which may be mononuclear or polynuclear.

18. A composition for gas storage according to claim 17, wherein the organic linkers are selected from the group consisting of: benzene tricarboxylate (BTC), ADC (acetylene dicarboxylate), NDC (naphthalene dicarboxylate), BDC (benzene dicarboxylate), ATC (adamantine tetracarboxylate), BTB (benzene tribenzoate), MTB (methane tetrabenzoate) and ATB (adamantine tribenzoate).

19. A composition for gas storage according to claim 1, wherein the particles of MOF comprises at least one selected from the group consisting of UIO-66, UIO-67, HKUST-1, PCN-14, Al-Fumarate and MOF-210.

20. A composition for gas storage according to claim 1, wherein the composition is a composite in the form of one or more shaped bodies having a crush strength in the range of from 2 kg to 50 kg.

21. A process for preparation of the composition for gas storage according to claim 1, the process comprising providing particles of amorphous MOP and particles of MOF, wherein the amorphous MOP is a hypercrosslinked polymer comprising optionally substituted aryl groups covalently linked by methylene bridging groups ($CH_2$) to form (Ar—$CH_2$—Ar—$CH_2$)$_n$— wherein n is the number of repeating units, mixing the particles to form a uniform mixture thereof and compressing the mixture to fuse and shape the mixture of particles and form a composite.

22. A process according to claim 21 comprising pressing or extruding the uniform mixture of particles.

23. A process according to claim 21, wherein the mixture is subject to a temperature in the range of 10° C. to 300° C. and pressure in the range of 1 to 50 tonne.

24. A system for gas storage comprising a container having an entrance for the gas to be stored and optionally a separate exit for the gas to allow the gas to enter and exit the container and a composition for gas storage according to claim 1, within the container.

25. A system for gas storage according to claim 24 comprising a gas contained within the container.

26. A system for gas storage according to claim 24, wherein the gas is selected from the group consisting of hydrogen, natural gas, methane, saturated and unsaturated hydrocarbons including: propane, butane, isobutane as well as: phosphine, helium, oxygen, argon, hydrogen sulphide, biogas, arsine, boron trifluoride, carbon monoxide, diborane, trimethylboron, carbon dioxide, dichlorosilane, disilane, germane, methylsilane, silane, silicon tetrachloride, germanium tetrafluoride, silicon tetrafluoride, trichlorosilane, hydrogen bromide, hydrogen chloride, chlorine, iodine, nitrogen, air, ammonia, sulphur dioxide, tungsten hexafluoride, nitrous oxide, halocarbon 116, halocarbon 14, halocarbon 218, halocarbon 23, halocarbon 32, halocarbon RC318, hydrogen bromide, hydrogen chloride, hydrogen fluoride, chlorine, sulphur hexafluoride, boron trichloride, nitrogen trifluoride, methylbromide, a refrigerant gas, a fumigant gas, a pesticide gas and a noble gas.

27. A composition for gas storage according to claim 13, wherein the external cross-linker is selected from the group consisting of monochlorodimethyl ether and dimethyl formal and the aryl monomers are selected from the group consisting of optionally substituted styrene and styrene-divinyl benzene copolymers.

* * * * *